3,251,844
ANTHRAQUINONYL-DICHLOROQUINOXALINE DYESTUFFS
Josef Singer and Heinz Werner Schwechten, Leverkusen, Germany, assignors to Farbenfabriken Bayer Aktiengesellschaft, Leverkusen, Germany, a corporation of Germany
No Drawing. Filed Sept. 11, 1962, Ser. No. 222,937
Claims priority, application Germany, Sept. 23, 1961, F 34,996
12 Claims. (Cl. 260—262)

The present invention relates to novel anthraquinone dyestuffs; more particularly it relates to fibre-reactive anthraquinone dyestuffs of the formula

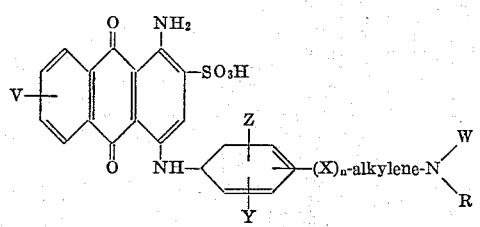

In the general formulae, R denotes hydrogen or on optionally substituted aralkyl or aryl residue; "alkylene" is a lower alkylene residue having 1 to 6 carbon atoms; $n$ is an integer of 0–1, X being a direct bond when $n$ is 0 and a member such as amino, —CO—, —SO$_2$, sulphonamide, carboxylamide, ether, or thioether groupings when $n$ is 1; in both cases X is attached in meta or para position with respect to the —NH— group on the phenyl ring; V is hydrogen or a sulphonic acid group, Y and Z are hydrogen or substituents such as alkyl, alkoxy, halogen, carboxylic acid or sulphonic acid groups, and W is an organic residue with at least one reactive group. W may be a straight-chain or branched alkylene group.

The dyestuffs are obtained when in dyestuffs of the general formula

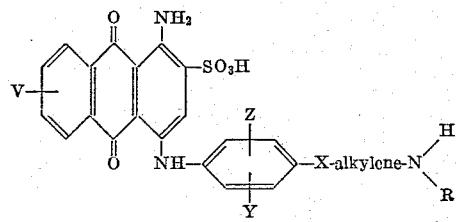 (II)

the grouping

is converted into the reactive group

In order to form the grouping

the compound (II) is treated, by a method known as such, with a reactive at least bifunctional component containing the residue W, for instance in a neutral or weakly acidic medium.

The organic residue W contained in the reactive group

may, inter alia, contain reactive halogen, esterified hydroxyl groups which can readily split off, or activated ether or thioether groupings as reactive groups, as well as carbon double and triple bonds which react with the corresponding reaction partners in the textile materials, e.g. with the hydroxyl groups of the cellulose or the amide groups of natural fibres. The organic residue W, which exhibits at least one reactive group, may belong to the aliphatic, isocyclic and heterocyclic series. Suitable components for the introduction of this residue, which contain at least two reactive substituents or groupings, are, inter alia, di- or tri-halotriazine compounds, such as di- or tri-chloro- or -bromo-sym.-triazines, alkyl or aryl-halogeno triazine compounds, halocyanotriazines, halo-pyrimidines, 5-cyano-halopyrimidines, as well as acyl compounds of suitable carboxylic and sulphonic acid halides, for instance halogen-fatty acid halides, such as β-chloro- or β,β-dichloropropionic acid halide, furthermore derivatives of unsaturated aliphatic carboxylic acids, such as acrylic and methacrylic acid halides or mono-, di- or tri-chloroacrylic acid halides; other suitable compounds are 2,6-dichloropyrimidine-4-carboxylic acid halides, 2,6-dichloropyrimidine-4-sulphonic acid halides, 2,3-dichloroquinoxyline-6-carboxylic acid halides or -sulphonic acid halides, ethylene-sulphonic acid halides, and the like.

For the preparation of the compounds (II), 4-bromo-1-amino-anthraquinone-sulphonic acids, which in addition to a sulphonic acid group present in the 2-position may contain a further sulphonic acid group in the 5-, 6-, 7-, or 8-position, can be reacted at the aromatically bonded amino group with an amino-aralkylamine, e.g. with an aminobenzylamine, such as 4-aminobenzyl-N-methylamine, 3-aminobenzyl-N-butylamine, 4-aminobenzyl-N-β-hydroxyethylamine, or 4-aminodibenzylaniline, and the resultant reaction product is sulphonated, if desired. The position of the sulfonic acid substituents which are introduced into the amine component is not always exactly detectable; the sulphonation most probably results in a mixture of isomeric monosulphonated products. The aminoarylalkylamine to be reacted may contain one to six C-atoms in the alkylene chain in a straight chain, or branched linkage. Examples are: 1-(4'-aminophenyl)-ethylamine-(2); 1-(o-, m-, or p-aminophenyl)-propyl-N-methylamine - (3), 1-(3' - aminophenyl)-butyl-N-methyl-amine-(3), 1-(o-, m-, or p-aminophenyl)-5-methyl-3-methylamine-hexane.

Dyestuffs of Formula II in which X represents a bridging group are obtainable in similar manner as the above indicated product without bridge grouping, i.e. if X is a direct linkage. For producing the bridging member containing compounds 4-bromo-1-amino anthraquinone sulphonic acids may be condensed with N-methyl-N-β-methylamino ethyl-p-phenylene diamine, or N-methyl-N-γ-aminopropyl-p-phenylene diamine, or 1-(4'-amino phenoxy)-butyl-N-methylamine-(4), or 1-(4'-amino-phenyl mercapto) - butyl-N-methylamine-4; or 1-(3'-amino-phenylsulphonyl)-butyl-N-methylamine-(4).

The aryl residue of the aminoarylalkylamine may be substituted by further substituents, such as alkyl or alkoxy groups or halogen. Examples of these are 2-methyl-5-aminobenzyl-N-methylamine, 2-methoxy-5-aminobenzyl-aniline, as well as 2-chloro-5-aminobenzyl-N-methylamine.

The novel dyestuffs are particularly suitable for the dyeing and printing hydroxyl or amide group-containing textile materials such as wool, silk, synthetic polyamide and polyurethane fibres, preferably for the production of dyeings and prints on natural or regenerated cellulose. For this purpose, it is suitable to operate with acid-binding additives, where necessary with the aid of heat, in accordance with the methods commonly applied for reactive dyestuffs.

In the following examples, the parts are parts by weight where not otherwise indicated.

*Example 1*

43.7 parts of the reaction product from 4-bromo-1-amino-anthraquinone-2-sulphonic acid and 4-aminobenzyl-N-methyl-amine are dissolved in 1000 parts of water with the addition of 4 parts of caustic soda, and stirred at 40° C. with 27 parts of finely powdered 2,3-dichloroquinoxyline-6-carboxylic acid chloride, the pH being adjusted to 6–8 by the addition of dilute soda-lye. After the reaction has been completed, the resultant reactive dyestuff is precipitated with sodium chloride, filtered off with suction, rinsed with an aqueous sodium chloride solution, and the suction filtered residue is dried at 40–50° C. The resultant dyestuff is a blue powder which dissolves in water with a blue colour. It has the structure:

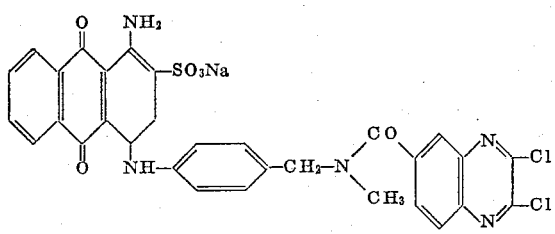

50 g. of cotton yarn are preliminarily dyed at 40° C. from a liquor which contains 2 g. of the resultant dyestuff per 1 litre of water. It is then warmed to 70–80° C. during 15 minutes with portionwise addition of 50 g. of sodium chloride. After a further 45 minutes 15 g. of soda are added, and it is dyed at 80° C. for another hour. After rinsing and soaping with boiling, a blue dyeing is obtained, with good wetting and light fastnesses properties.

*Example 2*

43.7 parts of the condensation product from 4-bromo-1-amino-anthraquinone-2-sulphonic acid and 4-aminobenzyl-N-methylamine as employed in Example 1 are dissolved in 150 parts of sulphonic acid monohydrate, sulphonated at utmost 35° C. by treatment with 70 parts of 20% SO₃-containing sulphuric acid, the sulfonation product is then dissolved at 30° C., in 500 parts of water, neutralized with soda lye and treated with 27 parts of 2,3-dichloroquinoxaline-6-carboxylic acid chloride, and the reaction mixture is maintained at a pH of 6–8 by the addition of sodium carbonate. The reaction is completed after some time. The reaction product is then isolated by the method described in Example 1. A blue powder is obtained which is readily soluble with a blue colour. It has the following structure:

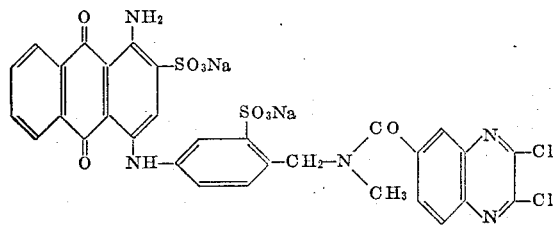

50 g. of cotton fabric are padded on a foulard with a solution, which contains 2 g./l. of the dyestuff, 5 g./l. of Turkey red oil, 15 g./l. of sodium carbonate, and 150 g./l. of urea. In order to prevent loss of moisture, the fabric is wrapped in a water-impermeable film, and after being left for 24 hours it is rinsed and soaped with boiling. Deep blue dyeings with good wet fastness properties are obtained.

If in place of the above starting product, use is made of one from 4-bromo-1-aminoanthraquinone-2-sulphonic acid, and o-, m- or p-aminobenzyl-N-methyl-amine or 3- or 4-aminobenzyl-N-ethyl- or -N-butyl-amine or N-β-hydroxyethyl-amine, or 4-aminodibenzyl-amine, blue reactive dyestuffs are obtained which also exhibit good properties.

*Example 3*

44 parts of the sodium salt of 4-(4'-aminoethyl-phenylamino)-1-aminoanthraquinone-2-sulphonic acid are sulphonated, and then reacted with 27 parts of 2,3-dichloroquinoxyline-6-carboxylic acid chloride as in Example 2. The resultant reactive dyestuff has the probable formula:

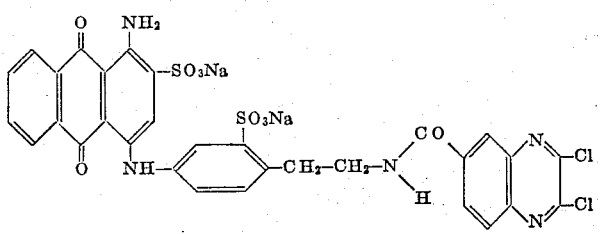

It dissolves in water with a blue colour, and dyes cotton in the presence of alkali and under heat treatment fast blue shades.

*Example 4*

The condensation product from 4-bromo-1-amino-anthraquinone-2-sulphonic acid and 1-(4'-aminophenyl)-propyl-N-methyl-amine-(3) is sulphonated as in Example 2, and acylated with 2,3-dichloroquinoxaline-6-carboxylic acid chloride. The resultant reactive dyestuff has the structure:

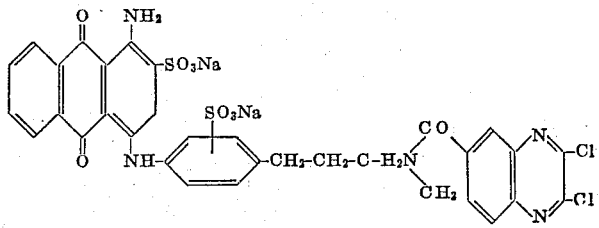

It is readily soluble in water with a blue colour. 50 g. of cotton yarn is preliminarily dyed at 20° C. for a short time from a liquor which contains 2 g. of the dyestuff per 1 l. of water. Thereafter, it is heated to 40° C. during 20 minutes with portionwise addition of 50 g. of sodium chloride, and then with addition of 15 g. of sodium carbonate; the fabric is thereafter dyed at 40° C. for another hour. After thorough rinsing and soaping with boiling, there are obtained deep blue dyeings with very good wet fastness properties.

*Example 5*

The condensation product from 4-bromo-1-aminoanthraquinone-2-sulphonic acid and 1-(3'-aminophenyl)-butyl-N-methylamine-(3) is sulphonated, and acylated with the carboxylic acid chloride from Example 4. There is obtained a dyestuff of the structure:

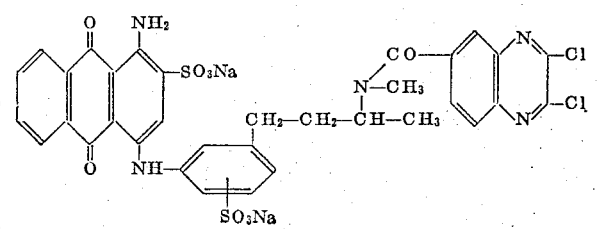

The product is readily soluble in water with a blue colour and yields blue dyeings with good fastnesses, when dyed according to the method stated in Example 4.

Example 6

The condensation product from 4-bromo-1-aminoanthraquinone-2-sulphonic acid and 1-(3'-aminophenyl)-5-methyl-3-N-methyl-amino-hexane, after sulphonation and acylation, produces the dyestuff of the structure:

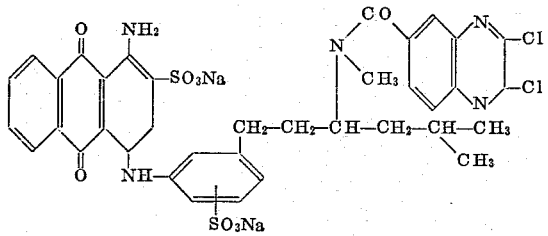

according to the method stated in Example 4. This produces fast blue dyeings, when employed according to the dyeing method of Example 4.

Example 7

The reaction products from 4-bromo-1-aminoanthraquinone-2-sulphonic acid and 4-methyl-3-aminobenzyl-N-methyl-amine, or 3,5-dimethyl-4-aminobenzyl-N-methyl-amine, or 5-amino-2-ethoxybenzyl-N-methylamine, or 3-amino-4-methoxybenzyl-N-methylamine, or 2-chloro-5-aminobenzyl-amine are sulphonated in the same manner as indicated in Example 2 and are acylated with 2,3-dichloroquinoxaline-6-carboxylic acid chloride. Reactive dyestuffs are obtained which produce fast blue to greenish-blue dyeings from a weak alkyline bath on staple fibre.

Example 8

51.7 parts of the reaction product from 4-bromo-1-aminoanthraquinone-2,6-disulphonic acid and 4-amino-benzyl-N-methylamine are dissolved neutral by the addition of soda lye and are acylated with 27 parts of 2,3-dichloroquinoxaline-6-carboxylic acid chloride while using 1 N soda lye at pH 6–7.5. After completion of the reaction the resulting reactive dyestuff is precipitated with sodium chloride, filtered off with suction, rinsed with aqueous sodium chloride solution, and the residue is dried at 40–50° C. The aqueous solution of the dyestuff dyes cotton fast blue shades after heat treatment in the presence of alkalies. The dyestuff has the formula:

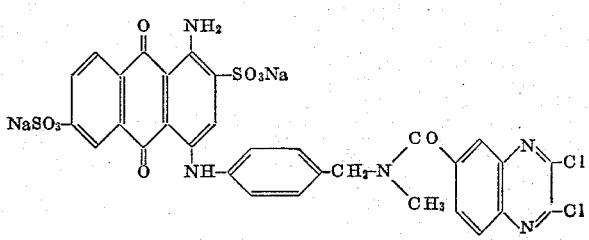

A dyestuff with similar properties is obtained if in place of the 4-bromo-1-aminoanthraquinone-2,6-disulphonic acid the isomeric 2,5-disulphonic is used.

Example 9

49.5 parts of 4-(4'-methylaminobutoxyphenylamino)-1-aminoanthraquinone-2-sulphonic acid are sulphonated as in Example 2 and are acylated with 27 parts of 2,5-dichloroquinoxaline-6-carboxylic acid chloride. The resulting dyestuff has the probable formula:

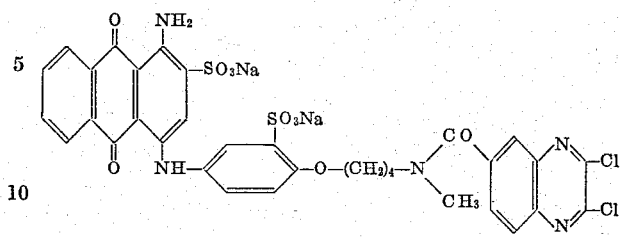

When dyed on cotton according to Example 1, it produces greenish blue shades being fast to wet processing.

Example 10

51 parts of 4-(4'-methylaminobutylmercaptophenyl-amino)-1-aminoanthraquinone-2-sulphonic acid are sulphonated as in Example 2 and are acylated with 2,3-dichloroquinoxaline-6-carboxylic acid. The resulting dyestuff has the probable formula:

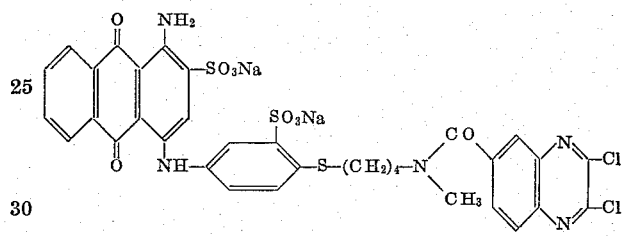

In the heat, it dyes cotton from a weak alkaline bath green-blue shades of good fastnesses.

Example 11

60.5 g. of the reaction product from 4-bromo-1-aminoanthraquinone - 2,6 - disulphonic acid and 4-(3'-amino-phenylsulphonyl)-butyl-N-methylamine are acylated with 2,3-dichloroquinoxaline-6-carboxylic acid chloride as in Example 7. A dyestuff is obtained of the formula:

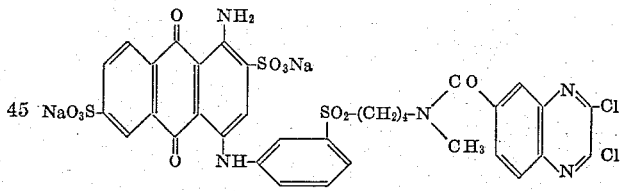

Example 12

18 parts of the sulphonated starting product obtained according to Example 2 from 3-aminobenzyl-N-methyl-amine and 4-bromo-1-amino-anthraquinone-2-sulphonic acid are dissolved in 200 parts of water at pH 6 and stirred, at 0 to 5° C., with a fine suspension, obtained by stirring an acetone solution of 6.2 parts of cyanuric chloride into 200 parts of ice water. By portionwise addition of 2 parts of soda, the mixture is thereby maintained at pH 6 to 7. After the condensation has been completed, the reaction product is precipitated with sodium chloride, isolated and washed with a solution of 11 parts of disodium phosphate in 100 parts of water. It is dried in vacuo at 30° C. The resultant dyestuff corresponds to the formula:

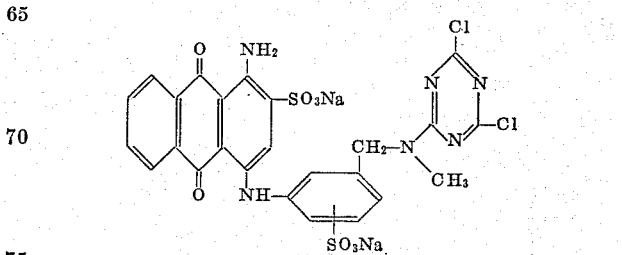

It easily dissolves in water with a blue colour.

50 g. of cotton yarn after being dyed at 20–25° C. for 10 minutes in a dye liquor from 1.5 g. of the dyestuff and 1 litre of water, are treated within 20 minutes with 50 g. of disodium sulphate and subsequently with 5 g. of sodium carbonate (previously dissolved). It is thereafter dyed in the cold for another hour, rinsed thoroughly, and soaped with boiling. The resultant blue dyeing possesses good fastnesses.

*Example 13*

43.7 parts of the condensation product from 4-bromo-1-aminoanthraquinone - 2 - sulphonic acid and 4-aminobenzyl-N-methylamine are sulphonated and then dissolved neutral at 10° C. in 500 parts of water with the addition of soda lye and acylated by stirring a saturated solution of 18 parts methoxydichloro triazine in acetone and 100 parts of 1 N soda lye. After the reaction has finished the resulting dyestuff is precipitated with sodium chloride and isolated. It corresponds to the formula

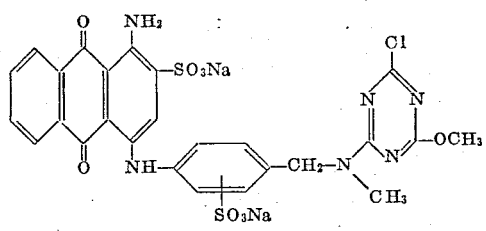

and dyes cotton fast blue shades according to the method of Example 1.

We claim:
1. A dyestuff of the formula

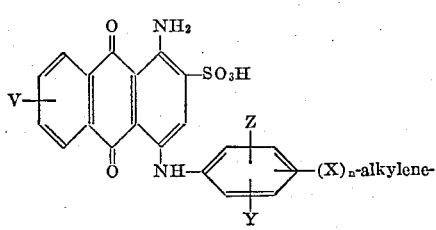

wherein V stands for a member selected from the class consisting of hydrogen and a sulphonic acid group, Y stands for a member selected from the class consisting of hydrogen, lower alkyl, lower alkoxy, chloro and a sulphonic acid group, Z stands for a member selected from the class consisting of hydrogen, lower alkyl, lower alkoxy, chloro and a sulphonic acid group, n is an intger of 0–1, and X is a member selected from the class consisting of meta-substituted —$SO_2$—, —O— and —S—, and para-substituted —$SO_2$—, —O—, and —S— when n is 1, and a similarly placed direct carbon-carbon linkage between the alkylene and phenyl groups when n is 0; "alkylene" means a lower alkylene group and R stands for a member selected from the class consisting of hydrogen, lower alkyl, hydroxy lower alkyl and benzyl.

2. A dyestuff of claim 1 wherein R stands for methyl.
3. A dyestuff of claim 1 wherein alkylene stands for a straight chain alkylene group.
4. A dyestuff of claim 1 wherein alkylene stands for —$CH_2$—.
5. A dyestuff of claim 1 wherein V stands for hydrogen.
6. A dyestuff of claim 1 wherein Z stands for hydrogen.
7. A dyestuff of claim 1 wherein Y stands for a sulphonic acid group.

8. The dyestuff of the formula

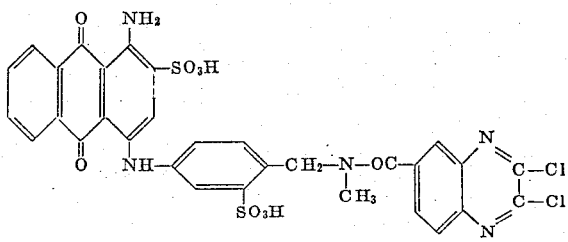

9. The dyestuff of the formula

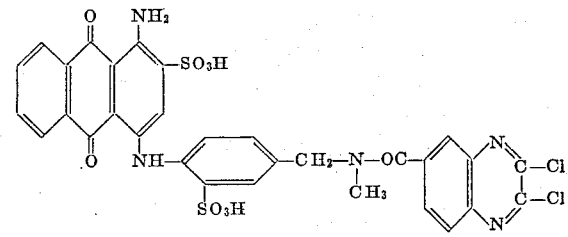

10. The dyestuff of the formula

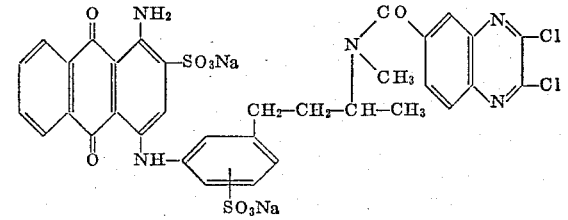

11. The dyestuff of the formula

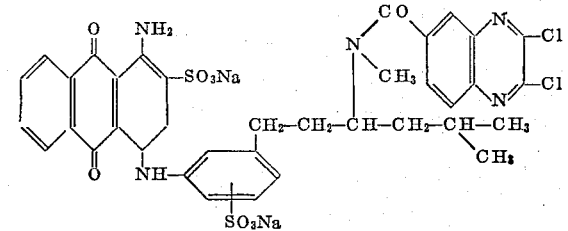

12. The dyestuff of the formula

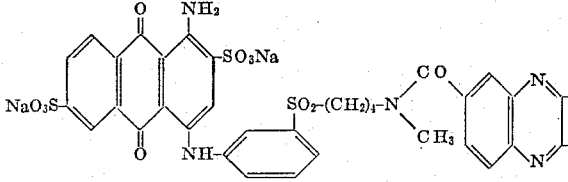

References Cited by the Examiner

UNITED STATES PATENTS

| | | | |
|---|---|---|---|
| 2,167,804 | 8/1939 | Gubler et al. | 260—249 |
| 2,773,871 | 12/1956 | Brassel et al. | 260—249 |
| 2,907,762 | 10/1959 | Heslop | 260—249 |
| 2,952,690 | 9/1960 | Riat | 260—372 |

FOREIGN PATENTS

| | | |
|---|---|---|
| 315,451 | 7/1929 | Great Britain. |
| 854,432 | 11/1960 | Great Britain. |

WALTER A. MODANCE, *Primary Examiner.*

NICHOLAS S. RIZZO, JOHN D. RANDOLPH, J. M. FORD, *Examiners.*

UNITED STATES PATENT OFFICE
CERTIFICATE OF CORRECTION

Patent No. 3,251,844  May 17, 1966

Josef Singer et al.

It is hereby certified that error appears in the above numbered patent requiring correction and that the said Letters Patent should read as corrected below.

Column 1, line 26, for "on" read -- an --; column 4, lines 40 to 48, the formula should appear as shown below instead of as in the patent:

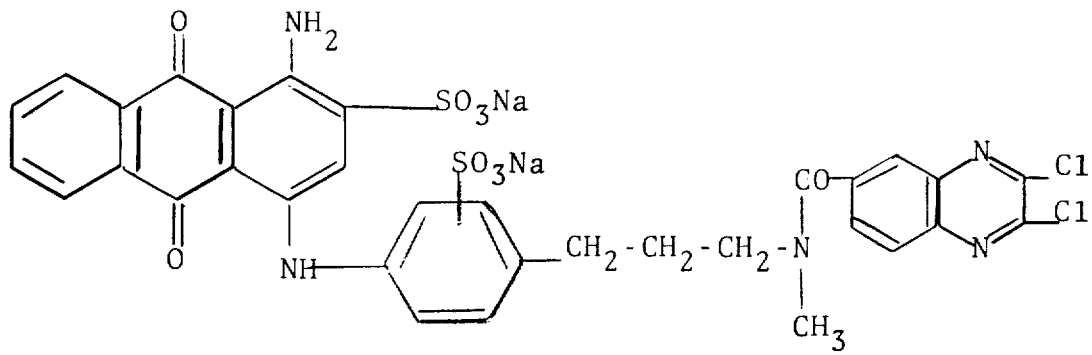

column 5, line 39, for "alkyline" read -- alkaline --; column 7, lines 36 to 45, the formula should appear as shown below instead of as in the patent:

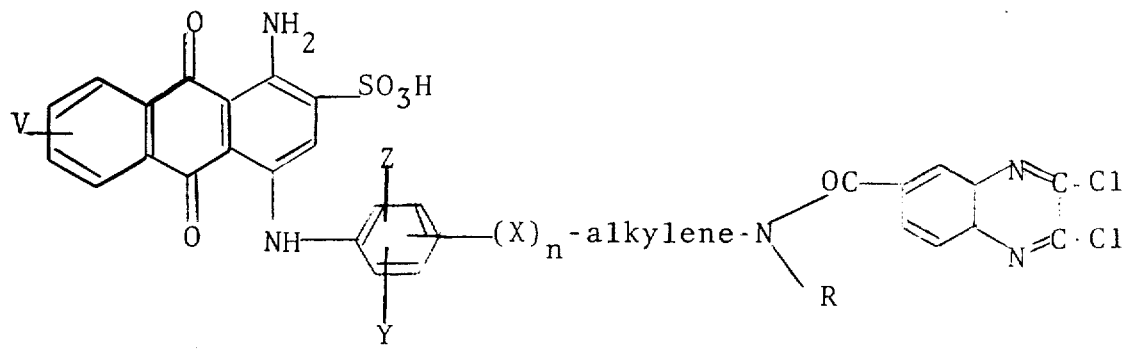

Signed and sealed this 22nd day of August 1967.

(SEAL)
Attest:

ERNEST W. SWIDER
Attesting Officer

EDWARD J. BRENNER
Commissioner of Patents